United States Patent
Garnett

(10) Patent No.: US 7,100,041 B2
(45) Date of Patent: Aug. 29, 2006

(54) CONFIGURING COMPUTER SYSTEMS

(75) Inventor: Paul J. Garnett, Camberley (GB)

(73) Assignee: Sun Microsystems, Inc., Santa Clara, CA (US)

( * ) Notice: Subject to any disclaimer, the term of this patent is extended or adjusted under 35 U.S.C. 154(b) by 550 days.

(21) Appl. No.: 10/408,754

(22) Filed: Apr. 7, 2003

(65) Prior Publication Data

US 2003/0229814 A1 Dec. 11, 2003

(30) Foreign Application Priority Data

Apr. 12, 2002 (GB) ................................. 0208515.7

(51) Int. Cl.
*G06F 9/445* (2006.01)
*G06F 15/177* (2006.01)
(52) U.S. Cl. .................. 713/100; 713/1; 713/2; 713/100; 711/102; 711/103
(58) Field of Classification Search .................. 713/1, 713/2, 100; 711/102, 103
See application file for complete search history.

(56) References Cited

U.S. PATENT DOCUMENTS

| | | | |
|---|---|---|---|
| 5,727,208 A * | 3/1998 | Brown | 713/100 |
| 6,353,885 B1 | 3/2002 | Herzi et al. | |
| 6,577,229 B1 * | 6/2003 | Bonneau et al. | 340/10.41 |
| 2001/0025363 A1 * | 9/2001 | Ussery et al. | 716/1 |
| 2003/0137404 A1 * | 7/2003 | Bonneau et al. | 340/10.41 |
| 2005/0177755 A1 * | 8/2005 | Fung | 713/300 |

FOREIGN PATENT DOCUMENTS

WO  WO 00/16193  3/2000

OTHER PUBLICATIONS

International search report application No. GB 0208515.7 dated Oct. 21, 2002.
"Implementing Energy Star Features on Network Computer Equipment", EECA, New Zealand, Dec. 20, 2001.
"Netra t 1120/1125", Sun Microsystems, Inc., Dec. 20, 2001.
"Configuring Desktop Computers to Turn Off During Periods of Inactivity", Colorado State University, Dec. 20, 2001.

* cited by examiner

*Primary Examiner*—Lynne H. Browne
*Assistant Examiner*—Nitin C. Patel
(74) *Attorney, Agent, or Firm*—Meyertons Hood Kivlin Kowert & Goetzel, P.C.; B. Noël Kivlin

(57) ABSTRACT

A computer system 10 with one or more processors 12 can be configured to operate in any one of a number of thermal environments. A setting system 14 sets operating parameters of the computer system such as processor operating voltage and frequency. A selecting system 16 selects values of operating parameters for use in setting by responding to an input of configuring data 20 to select a set of parameter values from a parameter value storage memory 18. The configuring data 20 may be input by the insertion of a smart card 58. Such configuring is useful in adapting computer systems during manufacture for compliance with desired specifications without hardware modification.

26 Claims, 4 Drawing Sheets

CONFIGURING COMPUTER SYSTEMS

BACKGROUND TO THE INVENTION

This invention relates to configuring computer systems to enable operating parameters of the computer system to be set in a desired manner, and in particular, but not exclusively, to configuring a server computer for compliance with a desired specification relating to the thermal environment in which the computer is to be operable.

Computer systems which are required to operate in critical applications, such as telecommunications systems, typically are required to be certified as being capable of operating in environmental conditions defined by a certification standard. For example, NEBS certification may be required to certify, among other things, that a computer server is capable of operating at an ambient temperature of up to 55° C.

A manufacturer of the computer server may also wish to supply computer servers for use in less demanding applications, such as for commercial use where, for example, it is sufficient for a computer server to be compliant with a requirement to be operable at an ambient temperature of 35° C. Under such circumstances, the manufacturer may therefore manufacture the computer server in two distinct hardware versions, a first version for commercial use being NEBS compliant with a specific exception for reduced temperature tolerance and a second version for telecommunications use and which is fully NEBS certified, being provided with additional cooling fans, heat sinks and other adaptations to allow more extreme temperatures to be tolerated.

This requirement to assemble two different hardware versions increases cost in terms of manufacture and supply logistics.

One way to adapt to operating at elevated temperatures is to reduce the power dissipation of the computer by for example reducing the operating frequency of its processor.

It is known in the field of laptop computers to provide dynamic management systems such as the Speed Step (Trade Mark) system in order to conserve battery life. Similarly, desktop computers are known to use dynamic management systems such as the Energy Star (Trade Mark) system to provide energy saving. In each case, operation of the processor may be interrupted or slowed to reduce power consumption during periods of inactivity. Such dynamic solutions are however inappropriate for controlling power dissipation in many circumstances, in particular when a computer system comprises a server computer where continuous and predictable performance is regarded as highly desirable.

SUMMARY OF THE INVENTION

Embodiments of the present invention provide an improved method of manufacture, an improved computer system, and an improved method of operating a computer system. One embodiment allows operating parameters for computer processing to be set in more than one way, by providing a selecting system for selecting one particular set of parameter values from a number of such sets of parameter values stored in the system.

The parameter values may, for example, control the operating frequency of one or more processors of the computer system and may also control other parameters such as the core voltage of the processors, thereby enabling the power dissipation of the computer system to be determined at an appropriate level.

Since reduced power dissipation enables the computer to operate in thermal environments of increased temperature without otherwise making hardware modifications, the selection of parameter values allows the system to be configured to be operable in a number of different thermal environments.

In the described embodiments, the system is configured by the input of configuring data representing a selection, typically by the manufacturer of the system, of a thermal environment within which the system is required to be operable. The choice of thermal environment may be dictated by a certification standard or user specification.

In use of the system, the selecting system refers to the configuring data, for example at each boot of the system, before selecting the set of operating parameters from the parameter value storage memory to be used thereafter in operation of the system.

Since the configuring process requires the input of data rather than hardware modification, the task of the computer system manufacturer is thereby simplified. Moreover, it is not necessary during configuration to input a set of parameter values since these are already stored in the system, the configuring data being required simply to determine which set of parameter values is to be selected whenever the computer system is in use.

An embodiment provides a smart card interface of the system which receives a smart card carrying the configuring data.

Embodiments of the present invention will now be described by way of example only and with reference to the accompanying drawings.

DETAILED DESCRIPTION OF EMBODIMENTS

Figure 1:
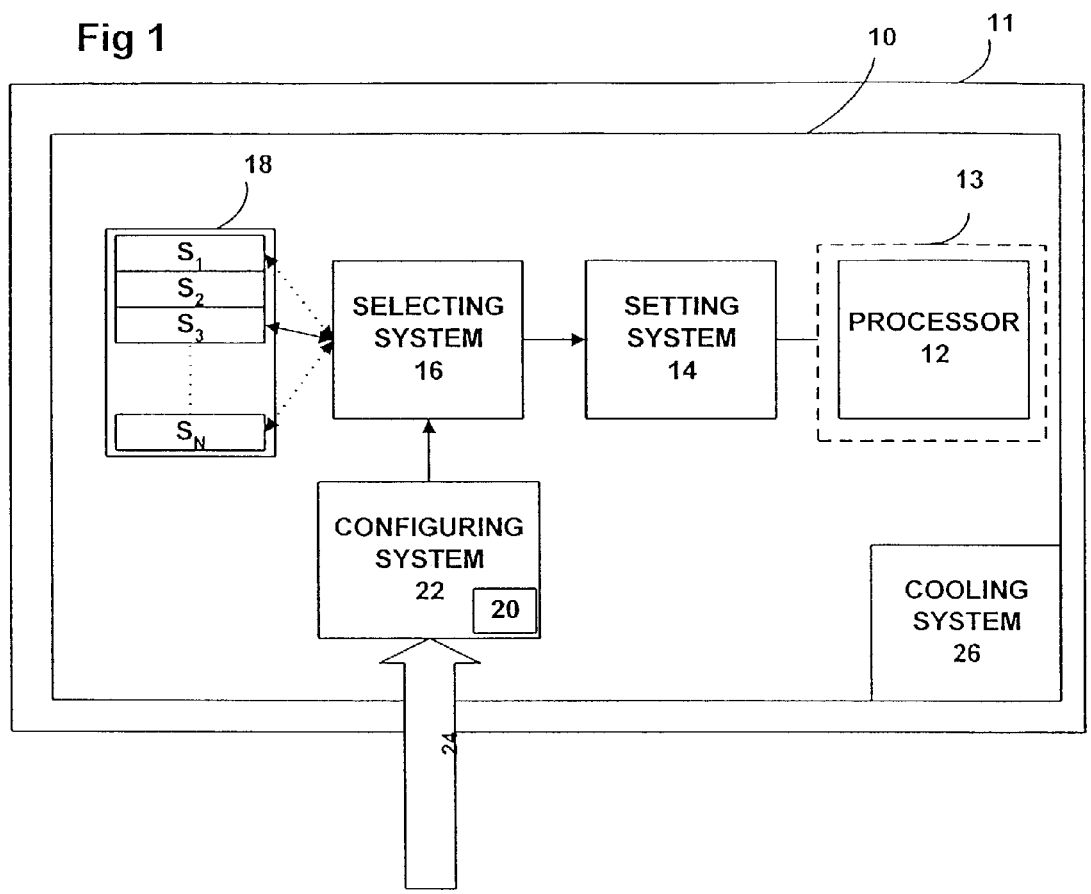
FIG. 1 is a schematic diagram of a computer system in which parameter values are selected during a configuring process.

FIG. 1 illustrates schematically a computer system 10 according to one embodiment. The computer system 10 comprises a processor 12 which operates within an operating environment 13 which controls operating parameters of the processor such as operating frequency and core voltage. The operating environment 13 maintains the operating parameters at parameter values determined by a setting system 14.

The parameter values are responsible for determining the processing power of the processor 12 and also its level of power dissipation. The computer system 10 operates within a thermal environment 11 defined by a maximum operating temperature. For example, where the computer system is a computer server required to be NEBS certified, the thermal environment 11 is such that the maximum ambient temperature is 55° C. If the computer server is intended for commercial use, it may be required to be operable in a less stringent thermal environment 11 in which the maximum ambient temperature is 35° C. The computer system 10 is capable of being configured for operation in any number of such thermal environments 11 by use of appropriate parameter values applied to the operating environment 13.

The setting system 14 applies the parameter values at each start-up of the computer system 10 and the operating environment 13 thereafter maintains the parameter values fixed at the desired setting.

The set of parameter values applied by the setting system 14 is selected by a selecting system 16 from a plurality of sets of parameter values stored in a parameter value storage memory 18. In FIG. 1, the parameter values storage memory 18 stores N sets of parameter values labelled $S_1$ to $S_N$, each set corresponding to a different thermal environment 11 for which the computer system 10 is configurable.

The selection made by the selecting system 16 is determined by configuring data 20 stored in a configuring system 22 whereby the selecting system 16 always selects the set of parameter values identified in accordance with the configuring data 20. The configuring data 20 may therefore comprise the address in memory of the set of parameter values to be selected or may for example simply be represented as a numerical value between 1 and N identifying the set of parameter values to be retrieved by the selecting system 16.

In a simple example in which N=2, the configuring data 20 may thereby be constituted by a single binary digit.

During a configuring process, the configuring data 20 is input by the manufacturer of the computer system 10 to the configuring system 22, represented in FIG. 1 by input 24.

The computer system 10 is provided with a cooling system 26 which does not need to be modified when the manufacturer of the computer system is producing computer systems destined for different thermal environments 11 since the configuring process requires only the input of configuring data 20.

The following example considers the case where N=2 so that the system is configurable for operation in any one of two different thermal environments 11 and the parameter value storage memory 18 stores two respective sets of parameter values.

When the intended use of the system 10 is in a commercial context which does not require the system to be certified to a high standard, the manufacturer of the computer system inputs whatever configuring data 20 is required to enable the selecting system 16 to select a first set of parameter values determining the appropriate operating frequency and voltage of the processor 12. The cooling system 26 is predetermined to match the resulting heat dissipation with a rate of heat extraction which allows the computer system 10 to operate within a first thermal environment in which temperatures up to 35° C. can be tolerated, this being sufficient for example for compliance with commercial user requirements. The first set of parameter values may for example determine the frequency and voltage levels to be nominal maximum values for the system.

When, however, the manufacturer is required to supply the computer system 10 with certification to a high standard, such as NEBS certification including a 55° C. ambient temperature working requirement, the manufacturer inputs whatever configuring data 20 is required to enable the selecting system 16 to select a second set of parameter values appropriate to this second thermal environment. The second set of parameter values determines the operating frequency and voltage of the processor 12 such that at least one of frequency and voltage level is less than that determined by the first set. Since maximum operating frequency increases with core voltage, it will generally be appropriate to reduce the core voltage when reducing operating frequency. Resulting operation of the computer system 10 therefore generates a lower level of heat dissipation which, when cooled by the existing cooling system 26, achieves the required performance for certification and allows operation in the second thermal environment where the ambient temperature can reach 55° C.

By providing two sets of parameter values, it is therefore possible to provide the two required variants of the computer system 10 without hardware modification, requiring only the input of appropriate configuring data 20 during the configuring process to select the desired set of parameter values. The configuring process will in general only be performed once, i.e. at the point of completion of manufacture of the computer system 10 and before supply of the system to a customer. Computer systems 10 configured for one use may readily be re-configured however by entering new configuring data 20, for example, before supply or during refurbishment.

Appropriate labelling will in general need to be applied to the computer system 10 to indicate the state into which it has been configured and hence its degree of compliance or certification.

In one example, values of voltage and frequency to be used as parameter values are:
set 1:—voltage 1.6 volts, frequency 900 MHz
set 2:—voltage 1.4 volts, frequency 750 MHz.

Figure 2:
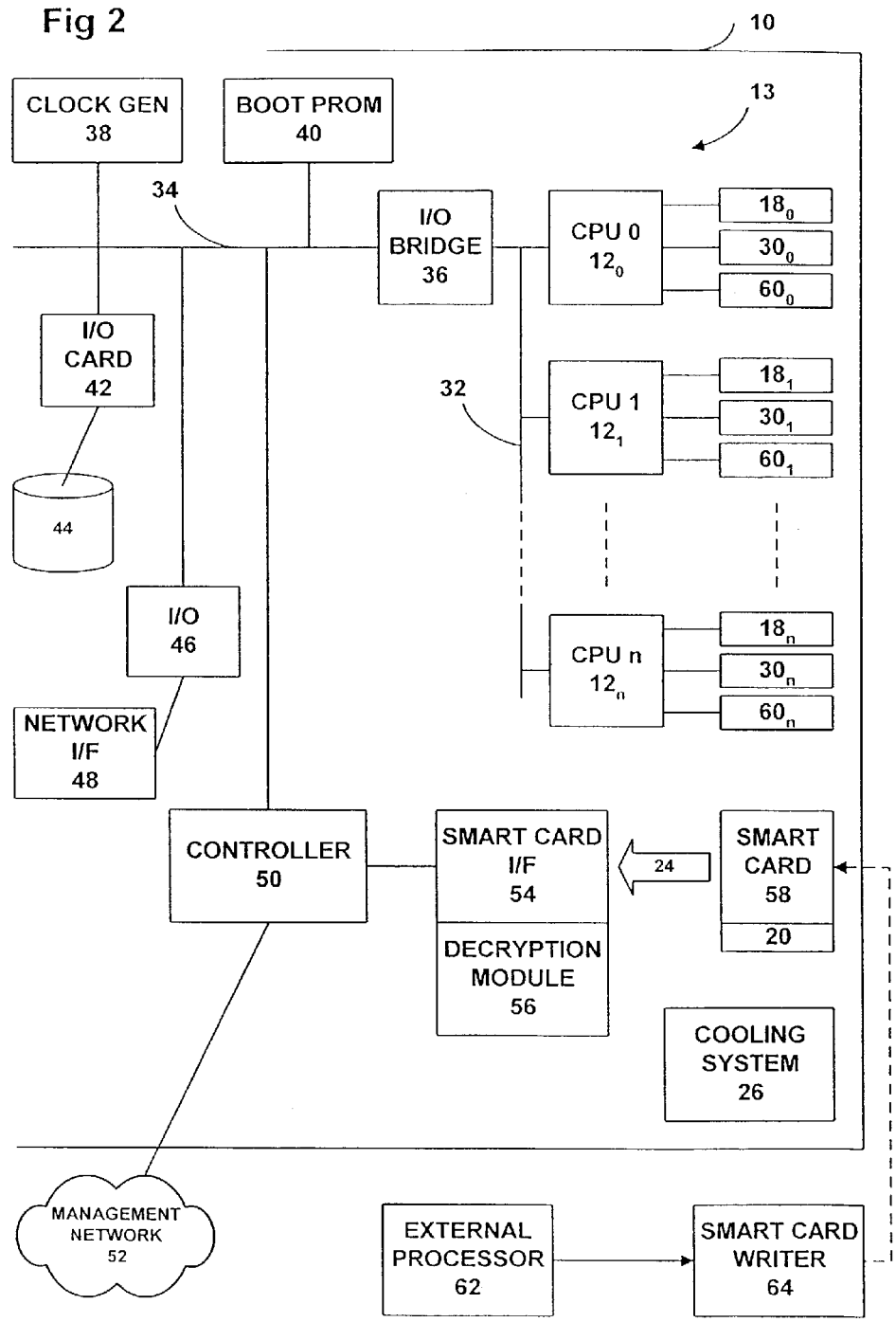
FIG. 2 is a schematic diagram of a computer server in which the configuring data is contained in a smart card.

FIG. 2 illustrates a further embodiment which will be described using corresponding reference numerals to those of FIG. 1 where appropriate for corresponding elements.

In FIG. 2, the computer system 10 is operated as a server such as a "Netra 20" (Trade Mark) server using multiple processors $12_0$–$12_n$ which perform multitasking using the Solaris (Trade Mark) computing environment created by Sun Microsystems, Inc. Each of the processors $12_0$–$12_n$ is provided with a respective random access memory $30_0$–$30_n$. The processors $12_0$–$12_n$ are connected to a common system bus 32 which connects with an expansion bus 34 via input/output bridge 36.

A clock generator 38 and boot PROM 40 are connected to the expansion bus 34 together with an input/output card 42 providing connection with a hard disk 44. An input/output card 46 is also connected to the expansion bus 34 for providing connection to a network interface 48.

A controller 50 connected to the expansion bus 34 provides lights-out management and other functions including facilitating remote turning on and off of the server computer 10, the sending of alerts and the processing of temperature monitoring signals. The controller 50 is provided with external connectivity with a management network 52.

A smart card interface 54 having a decryption module 56 is connected to the controller 50 and is arranged to receive a removable smart card 58 which carries data including the configuring data 20, thereby providing input 24 of configuring data. Other data carried by the smart card 58 includes an identifier for uniquely identifying the computer system 10.

The computer system 10 in FIG. 2 is provided with a cooling system 26 in the form of heat sinks and cooling fans.

Each of the set of processors $12_0$–$12_n$ is provided with a respective EEPROM $18_0$–$18_n$ located on a motherboard of the processor to which it is accessible. The EEPROM $18_0$ for the first of the processors $12_0$ (CPU 0) contains two sets of parameter values corresponding to first and second configuration options for the computer system 10 so that the EEPROM $18_0$ corresponds functionally to the parameter value storage memory 18 of the computer system of FIG. 1. Each of the processors $12_0$–$12_n$ is also provided with a respective DC to DC converter $60_0$–$60_n$ for supplying a configured level of core voltage to the respective processors by conversion from an input DC level.

The operating frequency of the processors $12_0$–$12_n$ is determined by the clock generator 38 which has a programmable oscillator. During booting of the computer system 10, the clock generator 38 initially operates using a default low value of frequency and then responds to a setting operation to thereafter control the processors $12_0$ to $12_n$ at a desired operating frequency.

FIG. 2 also shows schematically an external processor 62 used to prepare encrypted data, including the configuring data 20, to be loaded onto the smart card 58 by a smart card writer 64.

Figure 3:
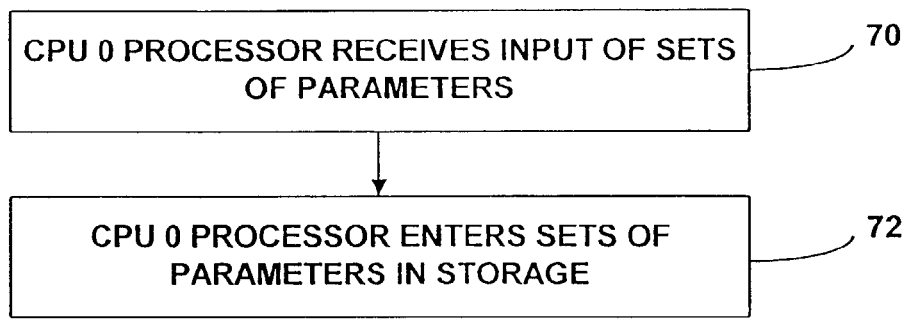
FIG. 3 is a flowchart for a storage process.
Figure 4:
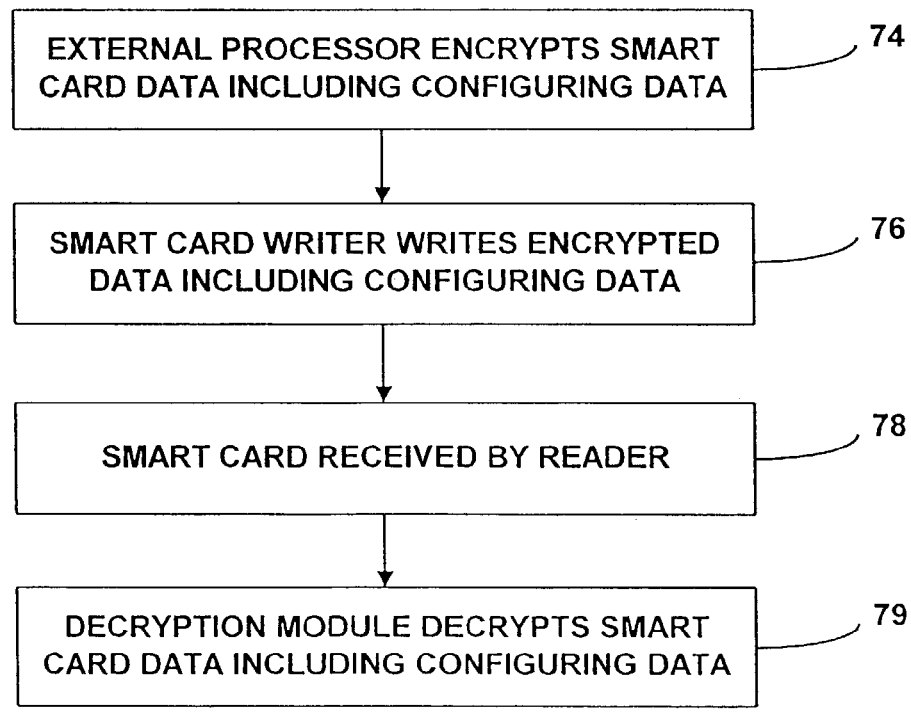
FIG. 4 is a flowchart for a configuring process.
Figure 5:
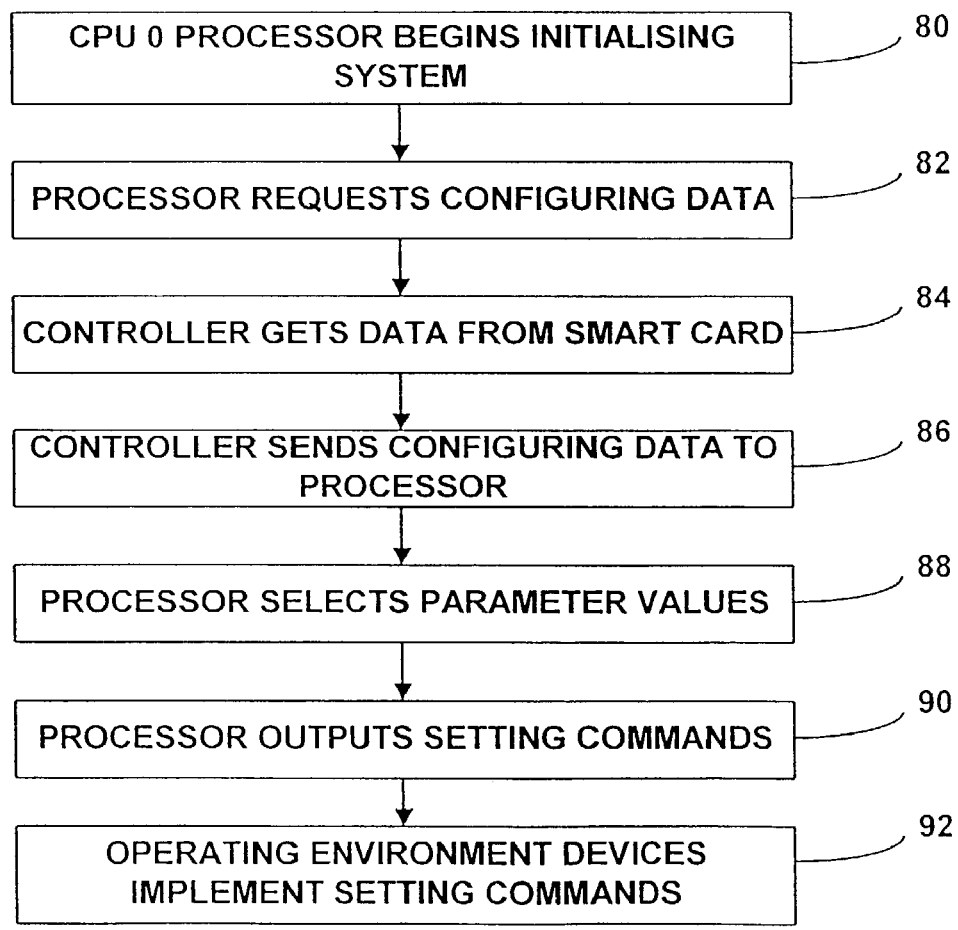
FIG. 5 is a flowchart for a selecting and setting process.

Operation of the embodiment of FIG. 2 is summarised in the schematic flow charts of FIGS. 3, 4 and 5. In FIG. 3, the process of storage of the operating parameters is described. At 70, the processor $12_0$(CPU 0) receives an input of a number of sets of operating parameters and at 72 stores the sets of operating parameters in parameter value storage memory $18_0$. The process of storing the sets of operating parameters may alternatively be performed during manufacture of the computer system 10. Where the sets of operating parameters are to be stored in a non-volatile memory such as EEPROM $18_o$ or an equivalent device, the sets of operating parameters may be stored by a programming procedure performed prior to assembly of the non-volatile memory with a circuit board on which it is to be mounted in the computer system 10.

FIG. 4 illustrates the configuring process. At 74, the external processor 62 encrypts data for loading onto the smart card 58, the data including the configuring data 20, and at 76 the smart card writer 64 writes the encrypted data including configuring data onto the smart card.

At 78, the smart card 58 is presented to and received by the smart card interface 54 which serves as a smart card reader. At 79, the decryption module 56 decrypts the data read from the smart card 58, thereby enabling the smart card interface 54 to provide the controller 50 with the configuring data 20 when required.

FIG. 5 illustrates the selecting and setting processes. At 80, the processor $12_0$ begins initialising the server computer 10, processor CPU 0 being designated as a main processor of the multiprocessor computer system 10 for this purpose. At 82, processor $12_0$ requests the configuring data 20 from the controller 50 and at 84 the controller retrieves the configuring data from the smart card interface 54.

At 86, the controller 50 sends the configuring data 20 to the processor $12_0$ which at 88 uses the configuring data to select a set of parameter values from the available sets of parameter values stored in the parameter value storage memory $18_0$.

At 90, the main processor $12_0$ (CPU 0) outputs setting commands to each device which is to receive a parameter value from the selected set of parameter values, in this example the devices comprising the clock generator 38 and each of the DC to DC converters $60_0$ to $60_n$. These devices together define the operating environment 13 of the processors $12_0$ to $12_n$.

At 92, the setting commands are implemented by each of the devices 38 and $60_0$ to $60_n$.

In this example, implementing the setting commands results in the clock generator 38 operating thereafter at a frequency defined by the frequency parameter value selected in accordance with the configuring data and the DC to DC converters driving the processors $12_0$ to $12_n$ (CPU 0 to CPU n) at the DC voltage selected in accordance with the configuring data.

By the above processes, the server computer 10 is initialized at each start-up to operate with selected parameter values in order to achieve a desired build standard and for meeting a desired level of certification or tolerance to environmental conditions.

The server computer 10 may be reconfigured at any time by removing the smart card and rewriting the configuring data 20 using the external processor 62 to prepare data and the smart card writer 64 to rewrite the data on the smart card. The operating system of the server computer 10 is arranged to prevent user access to the stored operating parameter values and the configuring data. In general therefore, the user cannot set the operational performance characteristics of the computer system. The manufacturer of the server computer therefore will in general be relied upon to reconfigure the operational performance characteristics should the need arise.

In the embodiment of FIGS. 2, the initialisation of the computer system 10 is performed by the CPU 0 processor $12_0$. Alternative embodiments are envisaged in which another processor of the computer system performs the initialisation and therefore performs the tasks referred to above as being carried out by the processor CPU 0. For example, the computer system 10 may be provided with a service processor for performing a number of tasks including system initialisation and fault diagnosis. The service processor in such an embodiment would perform the above described processes during initialisation.

Further embodiments are envisaged in which the configuring system 22 stores the configuring data 20 other than in a smart card. For example, the configuring data may be stored in non-volatile memory in a service processor or in non-volatile read-only memory on a backplane of the computer system. Alternatively, one or more fusible links may be used to form a circuit representative of the configuring data, the links for example being included in the lights-out management board, service processor or system backplane of the system.

Where a service processor is utilised in an embodiment, the configuring data may alternatively be stored using a configurable value input to the service processor.

In a further alternative embodiment, the booting and initialisation phase of the computer system is allowed to complete and at some predetermined time interval thereafter the configuring data is accessed and used to select and then set the parameter values. It is envisaged however that the setting process will occur only once during each session of use of the computer system.

The embodiment of FIG. 2 is described in the context of a computer server. Further embodiments are envisaged in which computer systems other than servers utilise the above described processes and apparatus for setting operating parameters, such systems including for example personal computers, mainframe computers, and hardware for use in telecommunications or dedicated business applications.

The computer system 10 has been described with reference to FIG. 2 as including EEPROM $18_o$ for storing sets of parameter values. Other forms of non-volatile memory devices may be used, a non-exclusive list of such devices including serial EEPROMs, MVRAMs, flash memory devices and FRAM (ferro magnetic random access memory) devices.

In each of the above described processes, the process may be implemented by a respective computer program providing instructions for controlling a processor of the apparatus to carry out the described method. The computer program may in each case be installed from a storage medium used as a carrier for the instructions or from a signal received via a communications system such as a network. Aspects of the invention are therefore considered to be embodied in such a storage medium and signal.

In those embodiments in which the computer program is stored in a read-only memory device or circuit, such a device or circuit is therefore considered to constitute a storage medium used as a carrier for the instructions.

The described embodiments refer to setting parameter values such as operating frequency and DC voltage. Further operating parameters may be configured as required for specific systems. For example, it may be appropriate in a multi processor system to turn on or off one or more processors in dependence upon the configuring data, to activate or deactivate a powered cooling system, or to activate or deactivate a thermal cutout circuit, so that one or more of the operating parameter values in each case define the number of units to be operated and thus the power expected to be dissipated by the overall computer system. The number of parameter values in each set has been described as being two in the above examples. Alternative embodiments may include any number of parameter values in each set.

Although methods and systems consistent with the present invention have been described with reference to one or more embodiments thereof, those skilled in the art will know of various changes in form and detail which may be made without departing from the present invention as defined in the appended claims and their full scope of equivalents.

The invention claimed is:

1. A computer system having at least one processor whose operating characteristics are dependent upon values of variable operating parameters of the computer system, the computer system being configurable for use in any one of a set of predetermined thermal environments and comprising:
   a parameter value storage memory storing a plurality of sets of operating parameter values, each set of operating parameter values corresponding to a respective one of the set of thermal environments;
   a configuring system for storing configuring data representative of a selection of thermal environment within which the computer system is to be configured to be operable;
   a selecting system operable to select from the parameter value storage memory a selected set of operating parameter values according to the configuring data; and
   a setting system for setting one or more of the operating parameters of the computer system, wherein the setting system is responsive to the selecting system to set the operating parameters at the operating parameter values of the selected set corresponding to the selection of thermal environment represented by the configuring data.

2. A computer system as claimed in claim 1 wherein the configuring system comprises a smart card interface operable to receive a smart card storing the configuring data.

3. A computer system as claimed in claim 2 wherein the smart card interface is operable to receive the smart card storing encrypted data and wherein the configuring system further comprises a decryption module operable to decrypt the encrypted data to obtain the configuring data.

4. A computer system as claimed in claim 1 wherein one of the operating parameters comprises an operating frequency, the computer system comprising a clock generator for controlling the operating frequency of the at least one processor and wherein the setting system is operable to set the operating frequency to an operating frequency value constituting one of the operating parameter values of the selected set of operating parameter values.

5. A computer system as claimed in claim 1 wherein one of the operating parameters comprises a voltage, the computer system comprising a voltage converter for controlling a voltage supplied to the at least one processor and wherein the setting system is operable to set the voltage to a voltage value constituting one of the operating parameter values of the selected set of operating parameter values.

6. A computer system as claimed in claim 1 wherein the parameter value storage memory comprises a non-volatile memory.

7. A computer system as claimed in claim 1 further comprising a boot system operable to control operation of the at least one processor during start-up of the computer system and operable to set default values of operating parameters for operation of the computer system during a start-up period.

8. A computer system as claimed in claim 7 wherein the selecting system is responsive to an instruction from the boot system to select the set of operating parameter values.

9. A computer system as claimed in claim 8 wherein the selecting system comprises a main processor constituted by the processor or one of the processors and wherein the main processor is operable to command the setting system to set the operating parameters in accordance with the selected operating parameter values in place of the default values.

10. A computer system as claimed in claim 1 comprising a plurality of processors.

11. A method of operating a computer system having at least one processor whose operating characteristics are dependent upon values of variable operating parameters of the computer system, the computer system being configurable for use in any one of a set of predetermined thermal environments; the method comprising:
   storing in a parameter value storage memory a plurality of sets of operating parameter values, each set of operating parameter values corresponding to a respective one of the set of thermal environments;
   a configuring system of the computer system storing configuring data representative of a selection of thermal environment within which the computer system is to be configured to be operable;
   a selecting system of the computer system selecting from the parameter value storage memory a selected set of operating parameter values according to the configuring data; and
   a setting system of the computer system setting one or more of the operating parameters of the computer system, wherein the setting system is responsive to the selecting system to set the operating parameters at the operating parameter values of the selected set corresponding to the selection of thermal environment represented by the configuring data.

12. A method as claimed in claim 11 wherein the configuring system comprises a smart card interface receiving a smart card storing the configuring data.

13. A method as claimed in claim 12 wherein the smart card stores encrypted data and wherein the configuring system further comprises a decryption module which decrypts the encrypted data to obtain the configuring data.

14. A method as claimed in claim 11 wherein the computer system comprises a clock generator controlling the operating frequency of the at least one processor and wherein the setting system sets the operating frequency to an operating frequency value constituting one of the operating parameter values of the selected set of operating parameter values.

15. A method as claimed in claim 11 wherein the computer system comprises a voltage converter for controlling a voltage supplied to at least one processor and wherein the setting system sets the voltage to a voltage value constituting one of the operating parameter values of the selected set of operating parameter values.

16. A method as claimed in claim 11 wherein the sets of operating parameter values are stored in a non-volatile memory.

17. A method as claimed in claim 11 wherein the computer system further comprises a boot system controlling operation of the at least one processor during start-up of the computer system and setting default values of operating parameters for operation of the computer system during a start-up period.

18. A method as claimed in claim 17 wherein the boot system instructs the selecting system to select the set of operating parameter values.

19. A method as claimed in claim 18 wherein the selecting system comprises a main processor constituted by the processor or one of the processors and wherein the main processor commands the setting system to set the operating parameters in accordance with the selected operating parameter values in place of the default values.

20. A method of manufacturing a computer system having at least one processor whose operating characteristics are dependent upon values of variable operating parameters of the computer system, the computer system being configurable for use in any one of a set of predetermined thermal environments;
the computer system comprising:
a parameter value storage memory storing a plurality of sets of operating parameter values, each set of operating parameter values corresponding to a respective one of the set of thermal environments;
a configuring system for storing configuring data representative of a selection of thermal environment within which the computer system is to be configured to be operable;
a selecting system operable to select from the parameter value storage memory a selected set of operating parameter values according to the configuring data; and
a setting system for setting one or more of the operating parameters of the computer system, wherein the setting system is responsive to the selecting system to set the operating parameters at the operating parameter values of the selected set corresponding to the selection of thermal environment represented by the configuring data;
the method comprising storing the sets of operating parameter values in the parameter value storage memory;
operating an external processor to generate the configuring data;
and inputting the configuring data to the computer system for storing in the configuring system so as to configure the computer system for use in the selected thermal environment.

21. A method as claimed in claim 20 wherein the configuring system comprises a smart card interface, the method comprising storing the configuring data in a smart card, and wherein inputting the configuring data compnses operating the smart card interface to read data from the smart card.

22. A method as claimed in claim 21 wherein the external processor encrypts the data stored in the smart card.

23. A method as claimed in claim 20 wherein one of the operating parameter values comprises an operating frequency of the at least one processor.

24. A method as claimed in claim 20 wherein one of the operating parameter values comprises a voltage supplied to the at least one processor.

25. A method as claimed in claim 20 wherein the sets of operating parameter values are stored in a non-volatile memory of the computer system prior to assembly of the non-volatile memory in the computer system.

26. A storage medium comprising processor implementable instructions for instructing one or more processors to carry out a method of operating a computer system having at least one processor whose operating characteristics are dependent upon values of variable operating parameters of the computer system, the computer system being configurable for use in any one of a set of predetermined thermal environments; the method comprising:
storing in a parameter value storage memory a plurality of sets of operating parameter values, each set of operating parameter values corresponding to a respective one of the set of thermal environments;
a configuring system of the computer system storing configuring data representative of a selection of thermal environment within which the computer system is to be configured to be operable;
a selecting system of the computer system selecting from the parameter value storage memory a selected set of operating parameter values according to the configuring data; and
a setting system of the computer system setting one or more of the operating parameters of the computer system, wherein the setting system is responsive to the selecting system to set the operating parameters at the operating parameter values of the selected set corresponding to the selection of thermal environment represented by the configuring data.

* * * * *